United States Patent [19]

Tachi

[11] 4,159,480
[45] Jun. 26, 1979

[54] METHOD OF INSERTING AN ADDRESS SIGNAL IN A VIDEO SIGNAL

[75] Inventor: Katsuichi Tachi, Kawasaki, Japan

[73] Assignee: Sony Corporation, Tokyo, Japan

[21] Appl. No.: 844,912

[22] Filed: Oct. 25, 1977

Related U.S. Application Data

[63] Continuation-in-part of Ser. No. 819,172, Jul. 26, 1977.

[30] Foreign Application Priority Data

Oct. 27, 1976 [JP] Japan .................. 51/128991

[51] Int. Cl.² ............................. H04N 5/76
[52] U.S. Cl. ........................... 358/8; 358/4; 358/127; 358/147
[58] Field of Search ............. 358/147, 8, 4, 127

[56] References Cited

U.S. PATENT DOCUMENTS 3,890,638  6/1975  Bargen ................. 358/8

FOREIGN PATENT DOCUMENTS 42-4540  2/1967  Japan.
47-46402  12/1972  Japan.

OTHER PUBLICATIONS

"American National Standard Time and Control Code for Video and Audiotape", *Journal of the SMPTE*, vol. 84, Jul. 1975.

*Primary Examiner*—Richard Murray
*Attorney, Agent, or Firm*—Hill, Van Santen, Steadman, Chiara & Simpson

[57] ABSTRACT

Method and apparatus for inserting an address signal in a video signal by compressing the time code signal including synchronizing bits inserted at every predetermined bit and cyclic redundancy check code and then inserting the compressed time code signal into at least one horizontal line period within a vertical blanking period of the video signal. The invention allows the time code signals to be reconstructed where the record medium is stopped or transported at very low speeds.

14 Claims, 31 Drawing Figures

Fig. 7

METHOD OF INSERTING AN ADDRESS SIGNAL IN A VIDEO SIGNAL

CROSS REFERENCE TO RELATED APPLICATION

This application is a continuation-in-part application of my copending U.S. Pat. application, Ser. No. 819,172, filed July 26, 1977.

Further, my copending U.S. Pat. application Ser. No. 819,173, filed July 26, 1977 discloses the editing method using a time code signal inserted into vertical blanking period.

BACKGROUND OF THE INVENTION

1. Field of the Invention:

This invention relates in general to a method and apparatus for inserting address signals in a video signal for a video tape apparatus.

2. Description of the Prior Art:

In order to edit video and/or audio signals rapidly and precisely, it has been proposed in the prior art to record an address signal on the magnetic tape in addition to the video and/or audio signal. In this case, as the address signals are provided signals of various codes, but the SMPTE time code signal is recommended as an American National Standard and the EBU time code signal is recommended as a standard code for 625 line/50 field television tape recordings. In the art, the above two time code signals are recorded on a record medium along its longitudinal track and read out of the signals can be achieved at tape speeds from slow to high speed. In the case where the record medium is stopped or transported at very low speeds, however, the reproduction of the time code signals becomes impossible. In fact, upon editing a video tape by a video tape recorder, it is very advantageous for an editor to be able to choose individual frames presented visually at very low tape speeds but the disadvantages of this method of operation is that the address of a chosen frame cannot be readily known with prior art systems.

The time code signals identify each television frame but the identification of its even or odd field and that of the phase of the burst signal of each television field are impossible. Therefore, precise editing cannot be achieved by the known prior art systems.

In a video tape recorder having a still reproduction mode, in order to obtain an address signal in the still reproduction mode, it has been proposed to convert the synchronizing signal in the vertical blanking period of a television signal to a signal corresponding to an address. For example, Japanese Patent Publication No. 42/4540 filed by Nippon Hoso Kyokai, published on February 24, 1967 discloses this method. This Japanese Patent Publication discloses an address signal including frame identification that can be reproduced even in a still reproduction moe but since there is no ordinary synchronizing pulse in the vertical blanking period, a special processing is necessary so as to supply the reproduced address signal to other video tape recorders (VTRs) and a time base corrector.

In these prior art devices since one address signal is recorded for each frame reading errors caused by dropouts or guard band noise during reproduction cannot be prevented.

SUMMARY OF THE INVENTION

It is an object of this invention to provide a method of inserting an address signal in the vertical interval of a video signal.

Another object of the invention is to provide a method of recording an address signal which prevents reading errors.

A further object of the invention is to provide a method of inserting an address signal which includes an error check code.

A still further object of the invention is to provide a method of recording an address signal which is suitable for a helical scan video tape recorder.

A still further object of the invention is to provide a method of inserting an address signal which overcomes the time base error.

A still further object of the invention is to provide a circuit which can read out an address signal without errors.

A yet further object of the invention is to provide a circuit which derives an address signal from a video tape recorder independent of the tape speeds.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
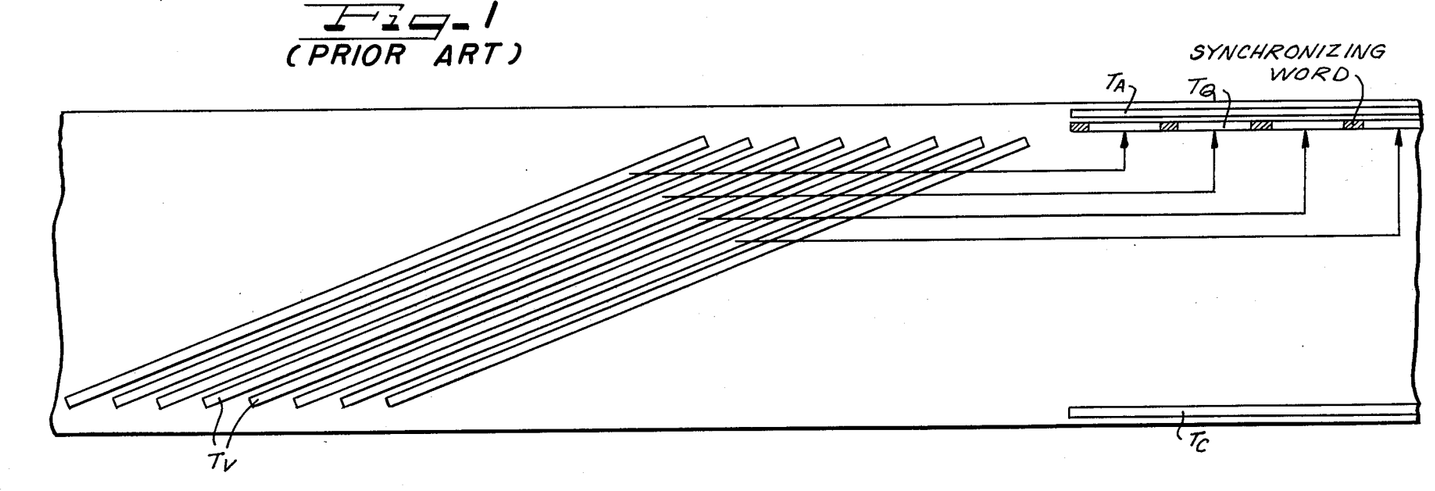
FIG. 1 is a top plan view of a part of a magnetic tape on which a video signal is recorded as slant tracks and an address signal is also recorded by a prior art method.

FIG. 1 illustrates a prior art method of recording an address signal on a magnetic tape comprising a magnetic tape T upon which an address signal is recorded in addition to a video signal.

In FIG. 1, $T_V$ represents a number of video tracks formed on a magnetic tape T and each of the video tracks $T_V$ includes a video signal of one field. Of course, a video signal of one form may be recorded on one video track. $T_A$ designates a track on the tape T which carries the audio signal. Track $T_Q$ represents the track which carries the cue signals and $T_C$ designates a track which carries the control signals. On the cue track $T_Q$ is recorded an address signal. In this case, a SMPTE time code signal is used as the address signal and two video tracks $T_V$ which form one frame are identified by one SMPTE time code signal.

The SMPTE time code is approved as the American National Standard time and control code for video and audio tape for 525 line/60 field television systems on Apr. 2, 1975 and published in the journal of the SMPTE, Volume 84, July 9, 1975.

Figure 2:
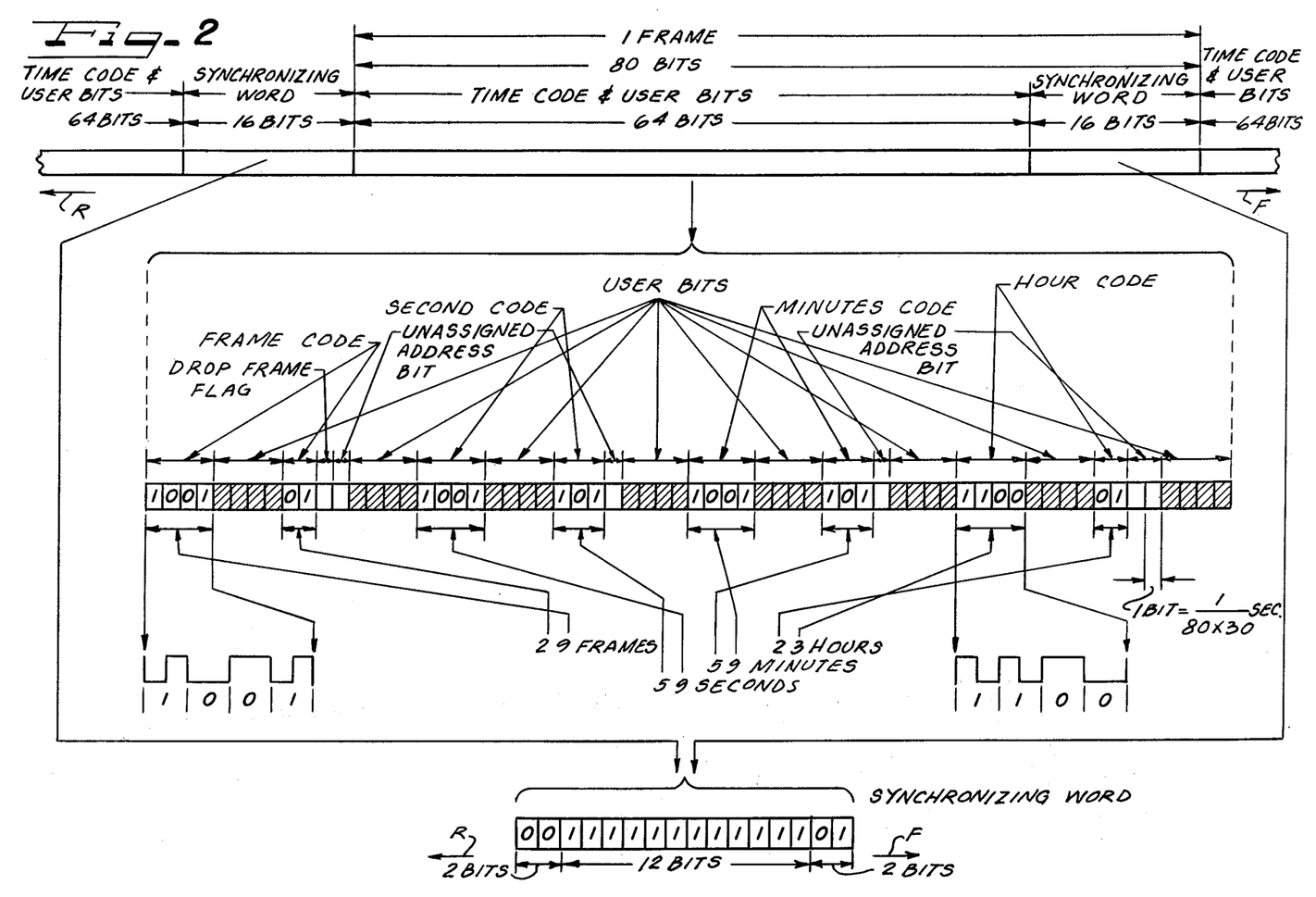
FIG. 2 is a schematic diagram illustrating an SMPTE time code signal recorded on the tape.

As shown in FIG. 2, which schematically illustrates the SMPTE code signal, each address corresponds to one frame and consists of 80 bits numbered 0 through 79 and the bit frequency is selected as 2.4 KHz. As illustrated in FIG. 2, time address bits consisting of 26 bits indicate 29 frames, 59 seconds, 59 minutes and 23 hours. The bit number 10 is the drop frame flag, the bit numbers 11, 27, 43, 58 and 59 are unassigned address bits and the bit numbers 4 through 7, 12 through 15, 20 through 23, 28 through 31, 36 through 39, 44 through 47, 52 through 55 and 60 through 63 are user bits, respectively. The synchronizing word of 16 bits is arranged such that it is determined whether the tape is transported in the forward direction and, thus, the SMPTE time code signal when read out in the direction indicated by an arrow F or whether the tape is transported in the backward direction and hence the SMPTE time code signal is read out in the direction indicated by an arrow R. Thus, the time code signal can be correctly read out even if the tape is transported in either direction. In this case, the code signal is so recorded that the information "1" and "0" thereof are recorded as bi-phase mark as illustrated in FIG. 2.

As described above, if the address signal for each frame of the video signal is recorded on the track $T_Q$ which extends in the lengthwise direction of the tape T, editing of the tape can be accomplished very rapidly and precisely.

However, in the case of slow or still motion reproduction mode, the speed of the tape becomes very slow or the tape is actually stopped, then the code signal recorded on the track $T_Q$ cannot be read out.

FIGS. 3 through 9 illustrate an example of the invention which provides an address signal that can be read out even in slow or still reproduction modes and, thus, editing of a tape can be efficiently accomplished. The video signal of the NTSC system is used as an example.

Figure 3:
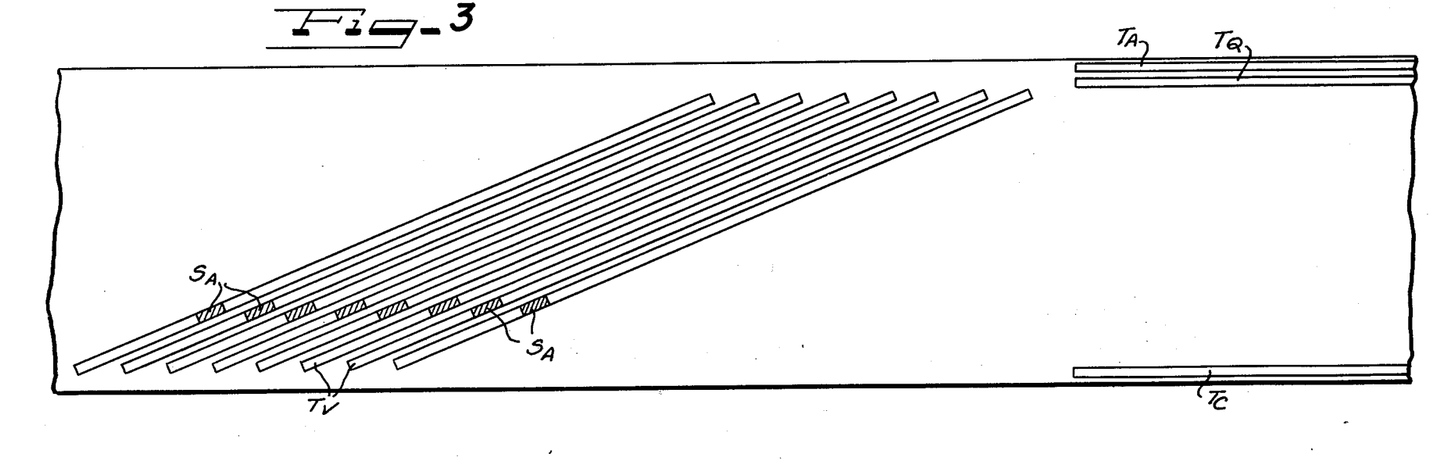
FIG. 3 is a top plan view of a part of a magnetic tape on which a video signal and address signal are recorded by the method of the invention.

FIG. 3 is a top plan view of magnetic tape T on which the video signal and address signals are recorded by the method and apparatus of the invention.

With the invention, an address signal $S_A$, identifying a video signal corresponding to each $T_V$ track, is inserted in the video signal as a digital signal and the video signal are recorded on the tape as slant tracks $T_V$. The address signals $S_A$ recorded on the video tracks $T_V$ are indicated as hatched areas in FIG. 3. The address signals $S_A$ are inserted into the video signals of odd and even fields of one frame and then recorded as shown in FIG. 3.

In this invention, the time code signal includes synchronizing bits which are inserted in the time code signal at every predetermined bit and then recorded on the video track $T_V$ so that by correcting the phase of the clock at every predetermined bit by utilizing the synchronizing signal upon read out, the code signal and the address signal can be read out precisely even if the bit frequency of the code signal varies by jitter, skew or other noise factors or by the variation of the horizontal frequency in a slow or still motion reproduction mode.

Further in this invention, there is provided an error check code in the code signal to avoid read out error.

Figure 4A:
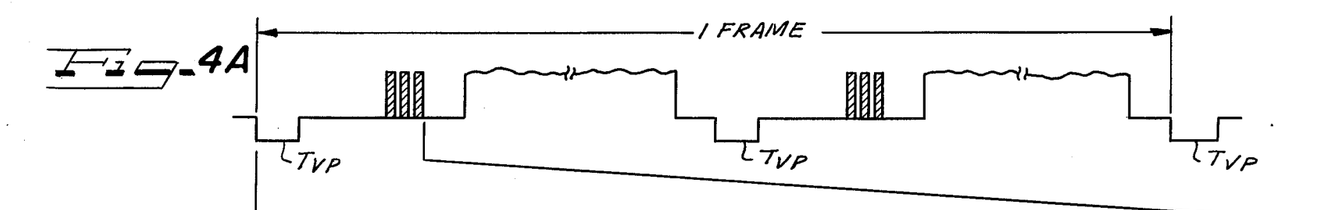
FIGS. 4A and 4B are diagrams illustrating a recorded pattern of signals on a tape according to the invention.
Figure 4B:
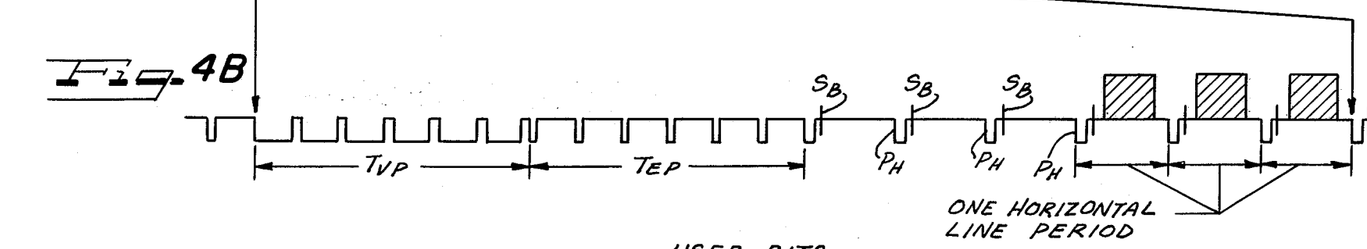

As shown with hatches in FIGS. 4A and 4B which comprises a record pattern of signals on the tape, not shown, according to the invention, one address signal is inserted into one horizontal line period in the suppressed line period within the vertical blanking period or vertical interval excepting that portion which comprises a vertical synchronizing pulse period $T_{VP}$ and equalizing pulse period $T_{EP}$. The address signal is inserted in the period after burst signals $S_B$ and it is desired that the same address signals be inserted repeatedly into three successive horizontal line periods. Hereinafter, this address signal will be referred to simply as the VITC (vertical interval time code) signal. The above suppressed periods correspond to the 10th through 21st line periods in the NTSC system.

The bit frequency $f_B$ of the VITC signal is selected as the color subcarrier frequency $f_{sc}$ which equals 3.58 MHz divided by an integer, for example, one-half ($\frac{1}{2}$) of the frequency $f_{sc}$. If the horizontal line frequency is taken as $f_H$ and the vertical frequency as $f_V$, respectively, the following relationship is established.

$$f_{sc} = \frac{455}{2} f_H = \frac{455 \times 525}{4} f_V \quad (1)$$

Thus, if the following relationship is established:

$$f_B = (\tfrac{1}{2}) f_{sc} \quad (2)$$

and the following equation 3 is obtained:

$$f_B = (455/4) f_H \quad (3)$$

Figure 4C:
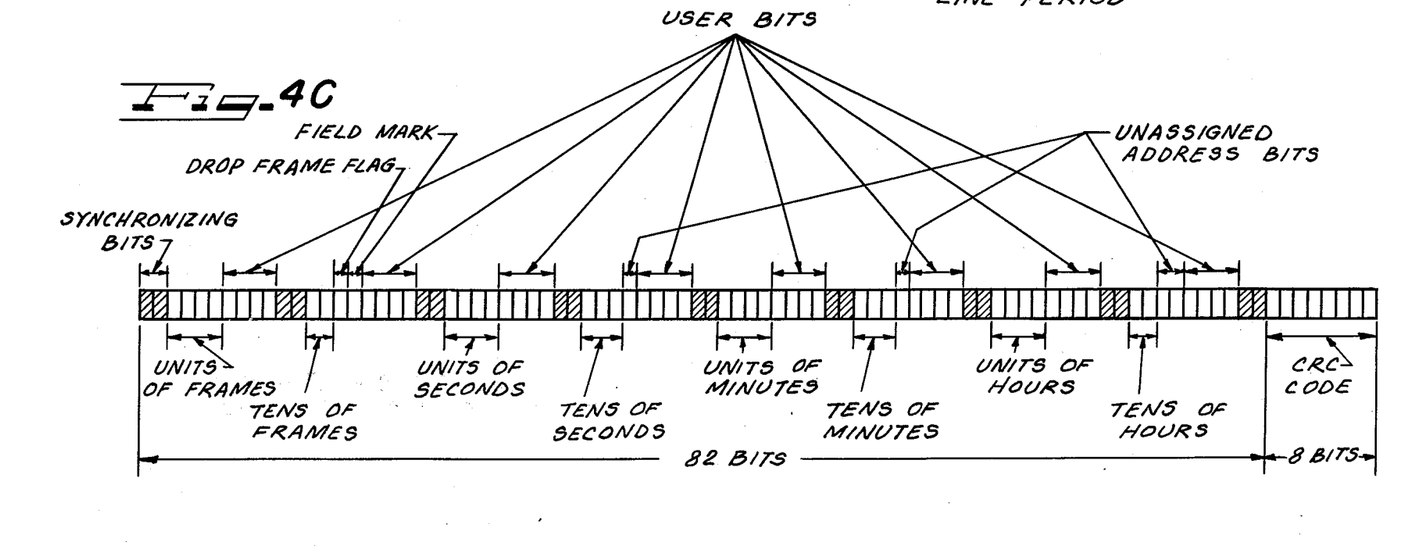
FIG. 4C is a schematic diagram illustrating a time code signal of the present invention which is recorded on the tape.

Now, referring to FIG. 4C, the arrangement of code signal of the invention will be explained. The code signal is recorded on the video track $T_V$, so it is not necessary to employ the synchronizing word at the top of the code SMPTE time code signal shown in FIG. 2. First, synchronizing bits consisting of 2 bits are placed at the top of the code signal as shown by a hatched portion in FIG. 4C. Synchronizing bits, each consisting of 2 bits are placed at every ten bits, which are shown by hatched portions in FIG. 4C. So, the bit numbers 0, 1, 10, 11, 20, 21, 30, 31, 40, 41, 50, 51, 60, 61, 70, 71, 80 and 81 are synchronizing bits. Time address bits are arranged similar to that of SMPTE time code. The bit numbers 2 to 5 are units of frames, 12 to 13 are tens of frames, 22 to 25 are units of seconds, 32 to 34 are tens of seconds, 42 to 45 are units of minutes, 52 to 54 are tens of minutes, 62 to 65 are units of hours and 72 to 73 are tens of hours, respectively. The bit number 14 is the drop frame flag, the bit number 15 is a field mark, the bit numbers 35, 55, 74 and 75 are unassigned address bits and the bit numbers 6 through 9, 16 through 19, 26 through 29, 36 through 39, 46 through 49, 56 through 59, 66 through 69 and 76 through 79 are user bits.

By making the bit numbers 15 be "0" for 1 and 3 field or "1" for 2 and 4 field, the field identification as to whether the field is even or odd can be accomplished. Total bits number of these information bits, synchronizing bits, time code bits, user bits and so on, are 82 bits. After these information bits, there is provided an error check code for the preceding code, for example, cyclic redundancy check code (hereinafter referred to as CRC code) consisting of 8 bits. In using CRC code, the data presented between 0 and 81 bit (in all 82 bits) are divided by a predetermined code or polynomial($X^8+1$) and the residual is coded into the final 8 bits. The last 8 bits are the CRC code. In the decoding process, all 90 bits, including the CRC code are divided by the predetermined code which is constant and can be expressed by $X^8+1$. The predetermined code used in the decoding process is the same predetermined code as used in the encoding process. The residual acts as an indicator of error. If there is a residual the information is incorrect, if not, the information is correct.

Figures 5A, 5B, 5C, 5D, 5E, 5F:
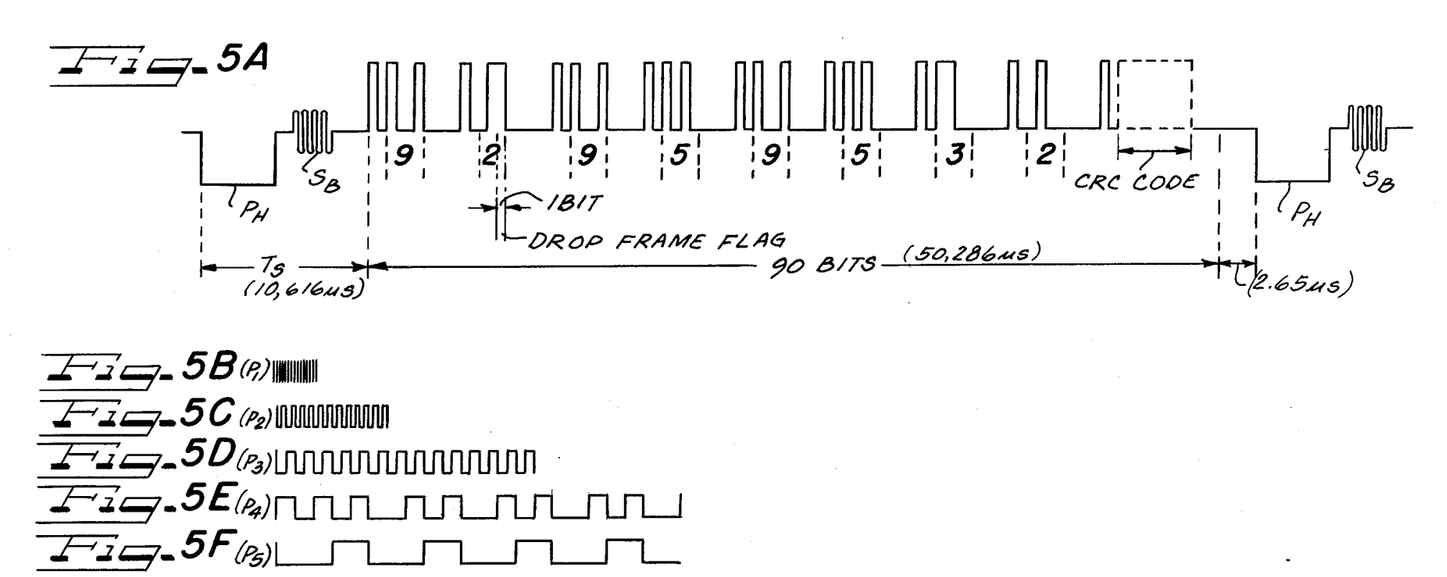
FIG. 5A is a diagram illustrating a recorded pattern of signals on a tape according to the present invention.
FIGS. 5B through 5K, 8A-H and 9A-D illustrate waveform diagrams used for explaining the operation of the circuit of the present invention.
Figures 5G, 5H:
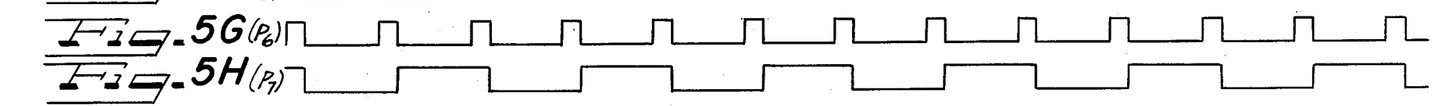
Figures 5I, 5J, 5K:
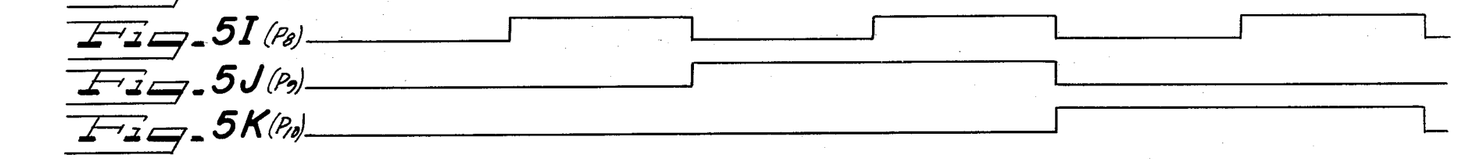

FIG. 5A illustrates an example of the time code signal representing an address according to the present invention. The code signal consisting of 90 bits is inserted in the period of 50.286 micro seconds and is inserted from the timing Ts (for example 10.616 micro seconds) after the front edge of the horizontal synchronizing signal till the timing 2.65 micro seconds before the front edge of the following horizontal synchronizing signals. The code signals illustrated in FIG. 5A indicates an address of 29 frames, 59 seconds, 59 minutes, 23 hours, the same as the address shown in FIG. 2.

In this case, it is sufficient that the informations "1" and "0" of the VITC signal are expressed as different levels, NRZ signal, as shown in FIG. 5A. For example, information "0" is selected as the pedestal level and the information "1" is selected as 50 IRE units or a signal higher than the "0" level and then the signals are recorded with opposite level to the horizontal synchronizing pulse viewed from the pedestal level.

Figure 6:
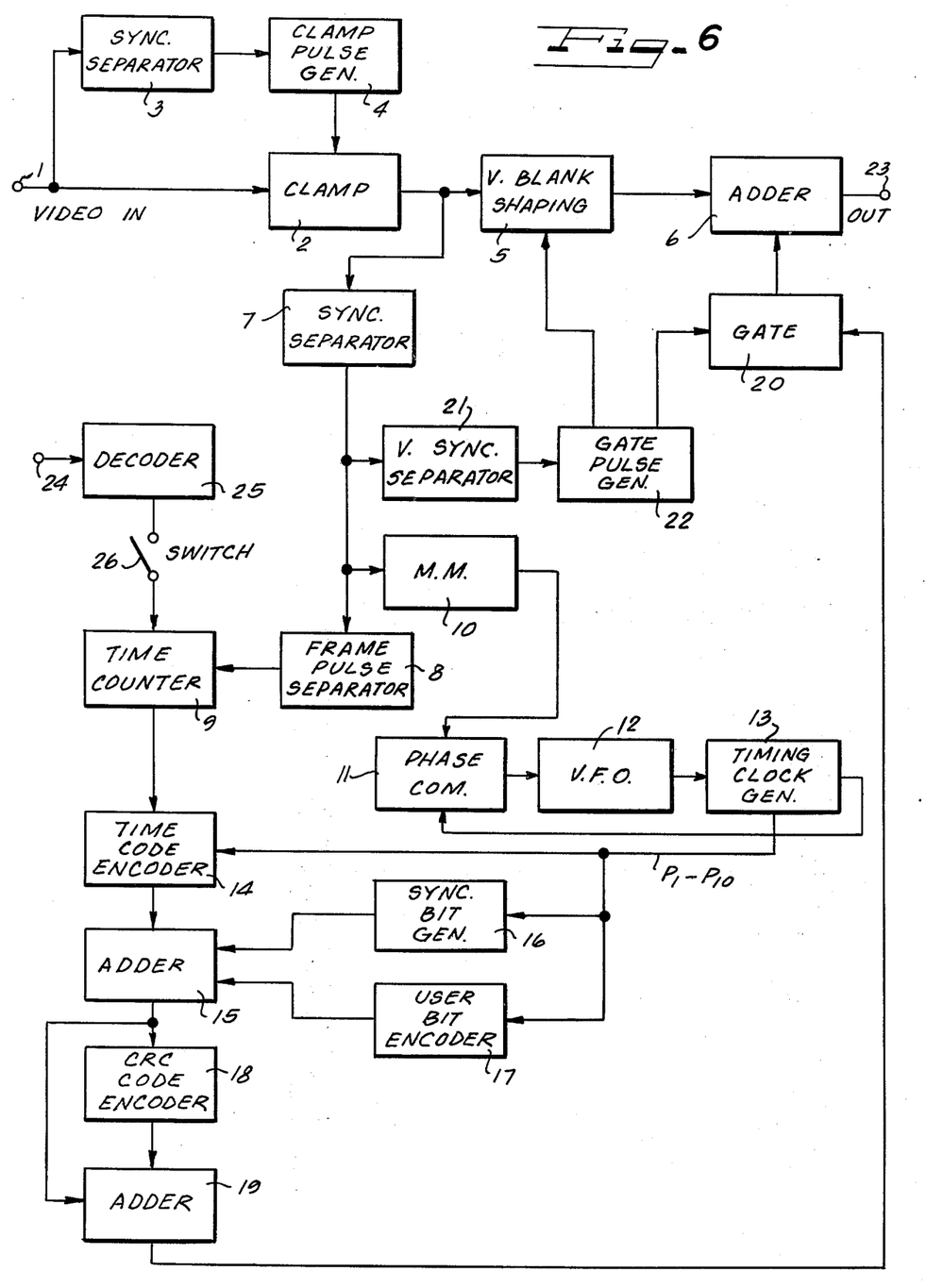
FIG. 6 is a block diagram illustrating a circuit according to the invention which is to be used to produce the time code signals and record them on a magnetic tape.

FIG. 6 illustrates a circuit for producing the VITC signal and for recording the same on a magnetic tape.

In FIG. 6, an input terminal 1 receives a video signal which is to be recorded. The video signal is fed to a clamp circuit 2 and synchronizing signal separator 3 which separates a synchronizing signal from the video signal. There is provided a clamp pulse generator 4 which generates a clamp pulse from the synchronizing signal. The video signal through the clamp circuit 2 is fed to an adder circuit 6 through a vertical blanking period shaping circuit 5 and also fed to a synchronizing signal separator 7. Frame pulses are separated by a frame pulse separator 8 which receives an output of the synchronizing signal separator 7. The frame pulses are fed to a time counter 9. The output of the synchronizing signal separator 7 is fed to a mono-stable multivibrator 10. The mono-stable multivibrator 10 removes an equalizing pulse from the signal and generates a signal having a horizontal frequency $f_H$, which is fed to a phase comparator 11. The phase comparator 11, a variable frequency oscillator 12 and a timing clock generator 13 form a PLL (phase lock loop) circuit. The timing clock generator 13 generates a signal having a frequency $f_H$ and clock pulses $P_1$ through $P_{10}$ shown in FIGS. 5B through 5K. The signal having a frequency $f_H$ generated by the timing clock generator 13 is fed to the phase comparator 11 to compare with the input from the mono-stable multivibrator 10. The resulting output from the phase comparator 11 is fed to the variable frequency oscillator 12 as a control signal for it. Thus, the clock pulses $P_1$ through $P_{10}$ are generated which are synchronized with the horizontal synchronizing signal of the video signal.

The clock pulse $P_1$ has the same frequency as the color subcarrier frequency $f_{sc}$. The clock pulse $P_2$ has a frequency of $\frac{1}{2} f_{sc}$, and one cycle of the clock pulse $P_2$ is equal to one bit cell of the code signal shown in FIG. 5A. Further, the clock pulse $P_3$ has a frequency of $\frac{1}{4} f_{sc}$. The timing clock generator 13 is constructed so as to generate the clock pulses $P_4$ through $P_6$ by a decimal counter from the clock pulse $P_3$, and the clock pulses $P_7$ through $P_{10}$ by a hexadecimal counter. The clock pulses from the timing clock generator 13 and an output from the time counter 9 are fed to a time code encoder 14 to form a time code (frame code, second code, minute code, and hour code) which is fed to an adder circuit 15. While synchronizing bits are formed by the synchronizing bit generator 16 by using the pulses from the timing clock generator 13, and user bits are formed at a user bit encoder 17. These synchronizing bits and user bits are fed to the adder circuit 15. Accordingly, the output of the adder circuit 15 is the code signal which consists of the time code, the user bits and synchronizing bits arranged in the manner shown in FIG. 4C. Then the output of the adder circuit 15 is fed to a CRC code encoder 18. Then the code signal shown in FIG. 4C is derived from an adder circuit 19 which is added with the CRC code which is derived by the CRC code encoder 18. The code signal is fed to a gate circuit 20.

While gate pulses which are corresponding to three successive horizontal line periods in the vertical blanking period are derived at the gate pulse generator 22 based on a vertical synchronizing pulse separated by a vertical synchronizing signal separator 21 from the output of synchronizing signal separator 7. Then the gate pulses are fed to the gate circuit 20. Thus, the code signal gated by the gate signal is fed to the adder circuit 6. A code signal which may have been inserted in the vertical blanking period is removed at the vertical blanking period shaping circuit 5 from the video signal by gating by the gate pulse from the gate pulse generator 22. Then the output from the circuit 5 is fed to the adder circuit 6.

Thus, the video signal in which the code signals are inserted into three successive horizontal line periods within the vertical blanking period is derived from an output terminal 23. The output video signal is recorded on a magnetic recording tape through a signal recording system of the VTR which includes FM modulator and so on.

Further, it is possible to provide the SMPTE time code from a terminal 24 and to synchronize the SMPTE time code with the time code which is to be inserted into the video signal. The synchronization can be achieved by pre-setting the time counter 9 when a preset switch 26 is on. The SMPTE time code is fed through a decoder 25 and the preset switch 26.

Figure 7:
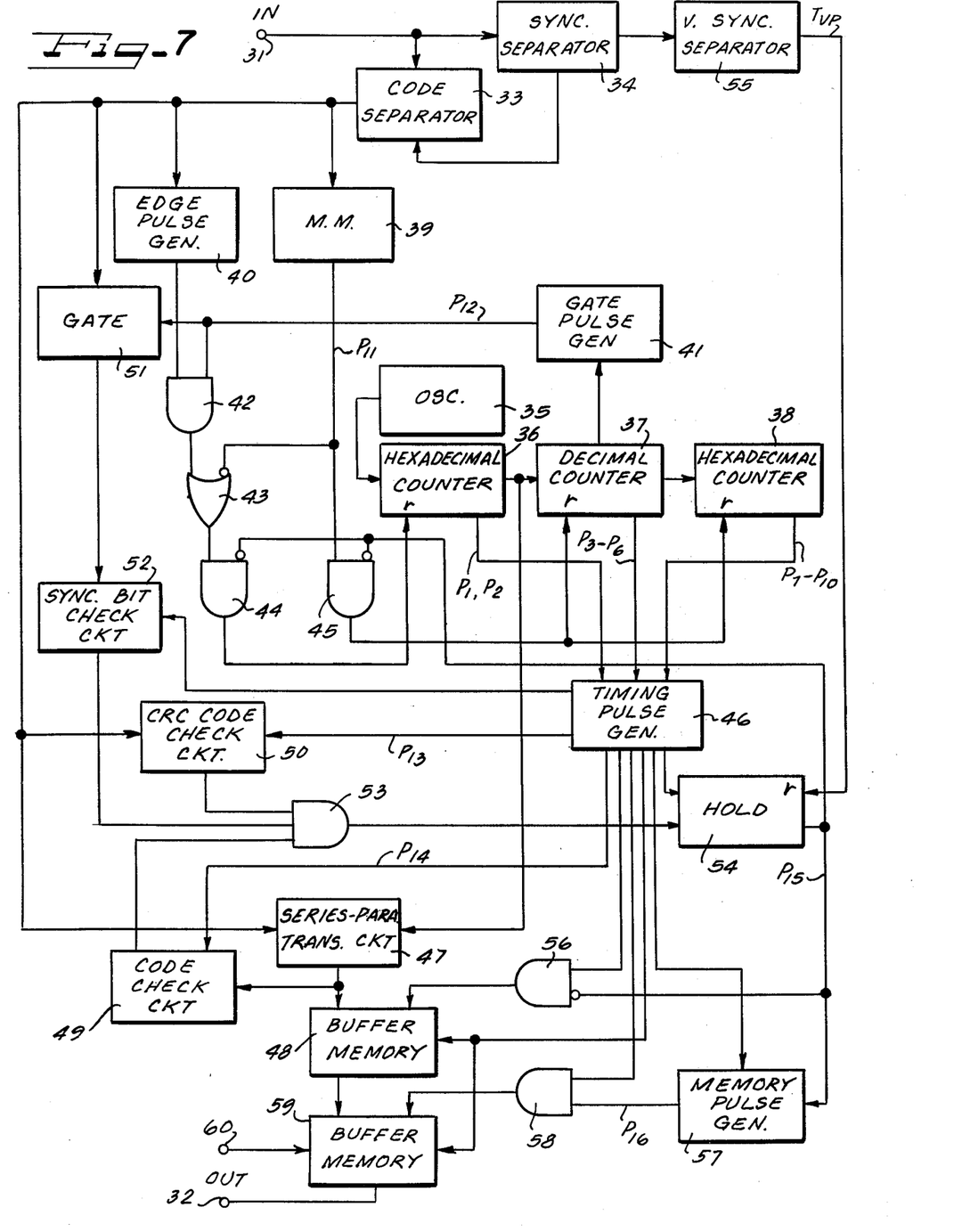
FIG. 7 is a block diagram illustrating a circuit of the invention for reading out the time code signals from a magnetic tape and decode the address.

FIG. 7 is a block diagram illustrating a circuit of the invention for reproducing the video signal recorded on the tape explained in the above, reading out the code signal from the video signal and, decoding the address.

In FIG. 7, an input terminal 31 receives a video signal reproduced from the video signal recorded on track $T_V$. The code signal is derived at an output terminal 32 by the following way. First of all, the video signal is fed to a code separator 33. The code signal is separated from the video signal by a synchronizing signal which is separated from the video signal at the synchronizing signal separator 34. There is provided an oscillator 35 which oscillates with a frequency which is n times of the color subcarrier frequency $f_{sc}$ (n is integer, for example, n equals to 8).

An output of the oscillator 35 is fed to a hexadecimal counter 36. An output of the hexadecimal counter 36 having a frequency of ½ $f_{sc}$ is fed to a decimal counter 37. An output of the decimal counter 37 is fed to a hexadecimal counter 38. Thus, the clock pulses $P_1$ and $P_2$ which are the same as the pulses of recording, are obtained (derived) from the counter 36, the clock pulses $P_3$ through $P_6$ are obtained from the counter 37, and the clock pulses $P_7$ through $P_{10}$ are obtained from the counter 38. These pulses are synchronized with the code signal separated from the reproduced video signal.

Figures 8A, 8B, 8C, 8D, 8E, 8F, 9A, 9B, 9C, 9D:
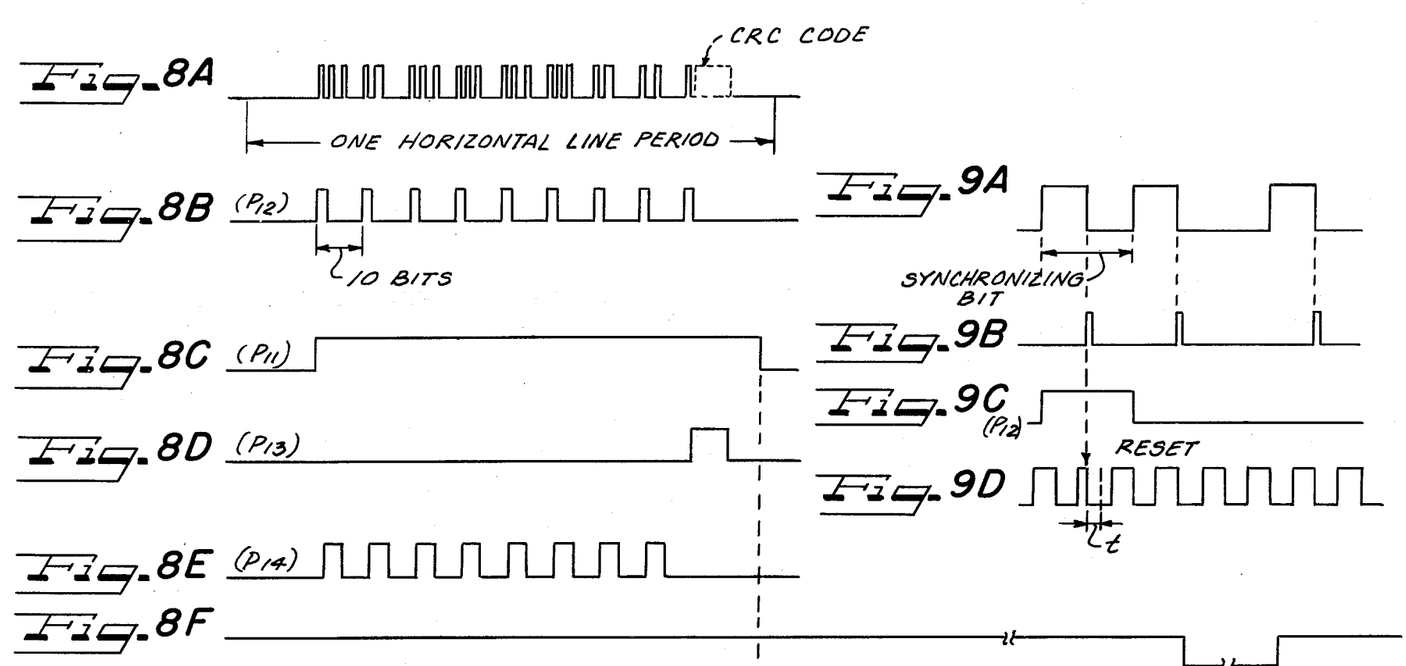

Thus, a mono-stable multivibrator 39 generates a pulse $P_{11}$ which is narrower than a horizontal line period but wider than the period where code signal of 90 bits exists as shown in FIG. 8C, while an edge pulse generator 40 generates edge pulse corresponding to a trailing edge of the code signal.

The output of the counter 37 is fed to a synchronizing bit gate pulse generator 41 to generate a synchronizing bit gate pulse shown in FIG. 8B which is similar to the clock pulse $P_6$ which has a value "1" at the phase corresponding to synchronizing bits.

Now, let us assume that the code signal including synchronizing bits of "(10)" as shown in FIG. 9A is separated from the video signal. Then the edge pulse generator 40 generates an edge pulse corresponding (synchronized) to the trailing edge of code signal, as shown in FIG. 9B. This edge pulse and the synchronizing bit gate pulse $P_{12}$ shown in FIG. 9C are fed to an AND gate 42 to derive only an edge pulse synchronized with the trailing edge of the synchronizing bit.

This edge pulse is fed to the counter 36 as a reset pulse through an OR gate 43 and an AND gate 44. Accordingly, as shown in FIG. 9D, the phase difference between the output of the counter 36 having a frequency of ½ $f_{sc}$ and the timing of the code signal is corrected and the output of the counter 36 is synchronized with the code signal. By the above construction, even when the time base fluctuates from the normal time base by jitter of slow motion reproduction, the timing of the clock pulse is synchronized with the reproduced code. Further, the synchronizing bits are inserted at every ten bits, so it is possible to achieve a very precise synchronization.

In the above example, the oscillator 35 is a fixed oscillator. However, such an oscillator that is phase locked to, for example, the horizontal synchronizing signal of the reproduced video signal, can further widen the extent of the timing that can be synchronized. Then it is possible to read the code signal even at the still mode reproduction in which a magnetic tape is stopped and at the fast mode in which the tape is run at the speed of several times of the normal speed of reproduction. The counters 37 and 38 are reset by the leading edge of the pulse $P_{11}$ which is an output of the monostable multivibrator 39 through the AND gate 45.

The output pulses of the counters 36, 37, and 38 are fed to a timing pulse generator 46 to form required timing pulses.

The code signal separated by the code separator 33 and output pulse of counter 36 is fed to a series-parallel transformation circuit 47 which comprises a shift register to rearrange the code signal except synchronizing bits and CRC code, that is, time codes and user bits (in all 64 bits) into parallel codes in which each code consists of 4 bits.

These parallel codes are written into a buffer memory 48 of a RAM (Random Access Memory) and also fed to a code check circuit 49.

The code check circuit 49 decodes the time code consisting of 4 bits which is supplied from the circuit 47 by the timing pulse $P_{14}$ corresponding to the timing of the time code signal shown in FIG. 8E, which is generated by the timing pulse generator 46, and check the decoded numbers whether they are possible numbers or not. There are some possibilities that, for example, hour code shows 27 hours or second code shows 81 seconds which are apparently incorrect caused by dropout.

The code check circuit 49 generates a signal "1" when the code is correct, and a signal "0" when the code is incorrect. The code signal from the code signal separator 33 is fed to a CRC code check circuit 50. The pulse $P_{13}$ shown in FIG. 8D which coincides the phase of the CRC code generated by the timing pulse generator 46 is fed to the CRC code check circuit 50. In the CRC code check circuit 50, the code signal including the information code and the CRC code (in all 90 bits) is divided by the predetermined code or polynomial and the residual is checked. If there is no residual, the code is correct then the circuit 50 derives a signal "1". When there are residuals the code is incorrect, the circuit derives a signal "0". Further, the synchronizing bits are separated from the code signal by gating at a gate circuit 51 by the synchronizing bit gate pulse $P_{12}$ shown in FIG. 8B. The separated synchronizing bits are fed to a synchronizing bit check circuit 52. Whether the synchronizing bits are correct or not, is checked by the suspected synchronizing bits from the timing pulse generator 46. If it is correct, the circuit 52 derives a signal "1", if not, it derives a signal "0".

The outputs of the synchronizing bit check circuit 52, the code check circuit 49 and the CRC code check circuit 50 are fed to an AND gate 53. When the output of the AND gate 53 is "1", which means the code signal is correct, a hold circuit 54 generates a pulse $P_{15}$ which is "1" shown in FIG. 8G by the timing pulse from the timing pulse generator 46. The hold circuit 54 is reset by a vertical synchronizing pulse $T_{VP}$ (shown in FIG. 8F) from the vertical synchronizing separator 55 which is connected to a synchronizing separator 34.

The output pulse $P_{15}$ of the hold circuit 54 is fed to the AND gates 44, 45. Thus, when the pulse $P_{15}$ becomes "1", reset of the counters 36, 37 and 38 is forbidden.

The pulse $P_{15}$ is fed to an AND gate 56 and a memory pulse generator 57. The AND gate 56 supplies a writing clock pulse for the buffer memory 48. During the period that the pulse $P_{15}$ is "0" codes of 4 bits from the series-parallel transformation circuit 47 are continuously written into the buffer memory, but the pulse $P_{15}$ becomes "1", the writing into the memory is forbidden.

Figure 8G:
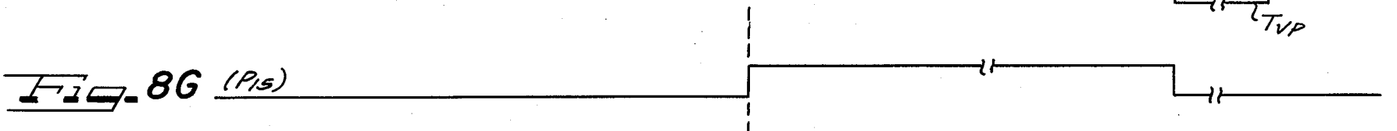
Figure 8H:
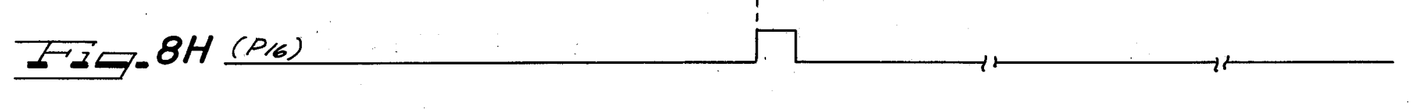

And, the memory pulse generator 57 generates a memory pulse $P_{16}$ which coincides the leading edge of the pulse $P_{15}$ as shown in FIG. 8G. By feeding the memory pulse $P_{16}$ to the AND gate 58, writing clock pulse is fed to a buffer memory 59 through the AND gate 58. Thus, contents of the buffer memory 48 is transferred to the buffer memory 59. The output data consisting of the time code and the user bits (in all 64 bits) is derived at the output terminal 32 by supplying a read-out address signal through a terminal 60. The read out data is fed to a display and/or editing apparatus.

As mentioned previously, the code signals are inserted into three successive horizontal scanning interval of the vertical blanking period. If the code signal inserted in the first horizontal line period is incorrect, the pulse $P_{15}$ from the hold circuit 54 does not rise then the date is not transferred from the buffer memory 48 to the buffer memory 59. The code signal of the next horizontal line period is checked in the same manner. Then only the correct code signal is stored in the buffer memory 59. Then it is not necessary to insert the code signals into successive horizontal scanning interval. The code signal may be inserted in any of the intervals if it is not in the useful scanning lines. Further, the number of the repetition of the code signal is not restricted.

In this invention, even only one of the code signals is read correctly, the hold circuit 54 generates the pulse $P_{15}$ and the system works well.

In the above example, the code signal which represents an address is recorded on the track $T_V$. But at the same time, the SMPTE time code signal which represents the same address which is recorded on the track $T_V$ can be recorded on the track $T_Q$ which is extending in the longitudinal direction of the magnetic tape. The SMPTE time code signal can be recorded as a bi-phase signal the same as the signal recorded on the track $T_V$.

Due to the construction of the recording apparatus of the present invention, since an address signal showing a video signal is recorded as a digital signal on the track of the video signal, the digital signal corresponding to the address can be read out positively even in slow or still motion reproduction mode and, thus, editing of the video tape can be very efficiently carried out.

Also, in the invention, the synchronizing pulses and other pulses are not processed but the address signal is inserted in the horizontal line period between the horizontal synchronizing pulses within the vertical blanking period so that no undesirable influences are caused on signal processing such as clamping the video signal, separating the synchronizing signal and so forth and the reproduction will not be interfered with in any manner.

The bit frequency $f_B$ of the inserted VITC signal is selected to be a fraction of the subcarrier frequency $f_{SC}$ by an integer so that if the video signal with the VITC signal is routed through the time base corrector the reproduced video signal is written in the memory by the clock pulse whose frequency is higher than the color subcarrier frequency by an integer time and then the written signal is read out in the memory to correct its time base. Thus, the clock references are the same in number at every one bit cell of the address signal and the condition of the address code is not affected by the time base correction.

Further, in this invention there are inserted synchronizing bits at every predetermined bit in the code signal, the read out error can be checked by the synchronizing bits, and by forming pulses synchronized with the synchronizing bits, read out of the code can be achieved precisely even if the bit frequency of the code signal varies by jitter, skew or other noise factors or by the variation of the horizontal frequency in a slow or still motion reproduction.

In this invention, error check code of CRC code is added to the code signal, so read out of the code signal can be achieved more precisely.

The above examples of the invention correspond to the cases in which the video signal of the NTSC system are utilized so that the bit frequency of the VITC signal is selected as $(1/n)f_{sc}$ (n being an integer). However, when video signals of other systems such as PAL systems or other types are utilized, it is necessary to select the bit frequency of the VITC signal in view of the predetermined relationship to the horizontal frequency such that all bits of the VITC signal can be inserted in one horizontal line period as, for example, $(455/4)f_H$ horizontal line frequency.

Although the invention has been described with respect to preferred embodiments, it is to be realized that modifications and variations can be made by one skilled in the art without departing from the spirit and scope of the novel concepts of the invention as defined by the appended claims.

I claim as my invention:

1. A method of inserting an address signal in a video signal comprising the steps of:
    (a) providing the address signal having a plurality of time code bits corresponding to the video signal recorded on one track followed by an error check code signal;
    (b) selecting at least one predetermined horizontal line period within a vertical blanking period from each field or frame of said video signal; and
    (c) inserting said address signal in said selected one horizontal line.

2. A method according to claim 1, in which said error check code is a cyclic redundancy check code.

3. A method according to claim 1, wherein said video signal includes a color subcarrier signal having a selected frequency and in which a bit frequency of said address signal is selected at 1/N of said selected frequency of said color subcarrier signal, wherein N is an integer more than 1.

4. A method according to claim 1, wherein said video signal includes a color subcarrier signal having a selected frequency and in which a bit frequency of said address signal is ½ of said selected frequency of the color subcarrier signal.

5. A method according to claim 1, in which said address signal includes synchronizing bits at every predetermined bits.

6. A method of inserting an address signal in a video signal comprising the steps of:
    (a) providing the address signal having a plurality of time code bits corresponding to one field of the video signal followed by an error check code signal;
    (b) selecting at least one predetermined horizontal line period within a vertical blanking period from each field or frame of said video signal;
    (c) inserting said address signal in said selected one horizontal line.

7. A method according to claim 6, in which said address signal includes a field identification bits.

8. A method of inserting an address signal in a video signal comprising the steps of:
    (a) providing the address signal having a plurality of time code bits corresponding to one frame of the video signal followed by an error check code signal;
    (b) selecting at least one predetermined horizontal line period within a vertical blanking period from each field or frame of said video signal;
    (c) inserting said address signal in said selected one horizontal line.

9. An apparatus for producing a video signal with an address signal therein, comprising:
    (a) means for providing the address signal corresponding to one field or frame of the video signal, said address signal consisting of a plurality of time code bits;

(b) means for providing a cyclic redundancy check code signal for the address signal;

(c) means for selecting at least one predetermined horizontal line period within a vertical blanking period of each field or frame of said video signal; and (d) means for inserting said address signal in said selected one horizontal line period.

10. An apparatus according to claim 9, further comprising means for providing synchronizing bits which is inserted into said address code at every predetermined number of bits.

11. An apparatus for producing a video signal with an address signal therein, comprising:

(a) means for producing the address signal corresponding to one field or frame of the video signal, said address signal consisting of a plurality of time code bits;

(b) means for encoding the address code into an address signal;

(c) means for providing a cyclic redundancy check code signal for the address signal;

(d) means for selecting at least one predetermined horizontal line period within a vertical blanking period of each field or frame of said video signal; and (e) means for inserting said address signal in said selected one horizontal line period.

12. An apparatus for reproducing an address signal from a video signal, comprising:

(a) means for receiving the video signal including the address signal having a plurality of time code bits corresponding to one field or frame of the video signal and a cyclic redundancy check code;

(b) means for separating the address signal from the video signal;

(c) means for storing the time code bits;

(d) means for checking the address signal; and (e) means for generating a read-out pulse based on the output of said checking means.

13. An apparatus as claimed in claim 12, wherein said address signal further includes synchronizing bits inserted at every predetermined number of bits.

14. An apparatus as claimed in claim 13, further comprising means for correcting time base error based on the synchronizing bits.

* * * * *